United States Patent [19]
Lutz

[11] 4,409,848

[45] Oct. 18, 1983

[54] METER READOUT WITH DC MOTOR IMPULSE GENERATOR

[75] Inventor: Paul D. Lutz, Grand Haven, Mich.

[73] Assignee: JSJ Corporation, Grand Haven, Mich.

[21] Appl. No.: 288,315

[22] Filed: Jul. 30, 1981

[51] Int. Cl.³ .................... G01F 1/00; G01F 15/14
[52] U.S. Cl. .................... 73/861.28; 73/273
[58] Field of Search .......... 73/861.77, 861.78, 861.79, 73/861.87, 861.88, 273; 310/36, 69, 75 A, 79, 84, 177

[56] References Cited

U.S. PATENT DOCUMENTS

| | | | |
|---|---|---|---|
| 719,167 | 1/1903 | Wilson | 310/84 |
| 1,285,243 | 11/1918 | Kuhn-Frei | 310/75 |
| 2,991,652 | 7/1961 | Bassett | 73/861.77 |
| 3,555,902 | 1/1971 | Onoda et al. | 73/861.78 |
| 3,949,606 | 4/1976 | Blancett | 73/861.87 |
| 4,020,689 | 5/1977 | Onoda | 310/75 |
| 4,060,746 | 11/1977 | Heyraund | 310/177 |
| 4,227,107 | 10/1980 | Ban et al. | 310/177 |

*Primary Examiner*—Herbert Goldstein
*Attorney, Agent, or Firm*—Price, Heneveld, Huizenga & Copper

[57] ABSTRACT

A fluid flow meter having an improved impulse generator for generating an electric signal to actuate a remote reader in response to a fixed volume of flow through the meter. A direct current motor having an armature having at least three poles or coils is used as the impulse generator. In a preferred embodiment of the invention the meter is modularly packaged in a cup-shaped housing with the various components layered one upon the other.

17 Claims, 9 Drawing Figures

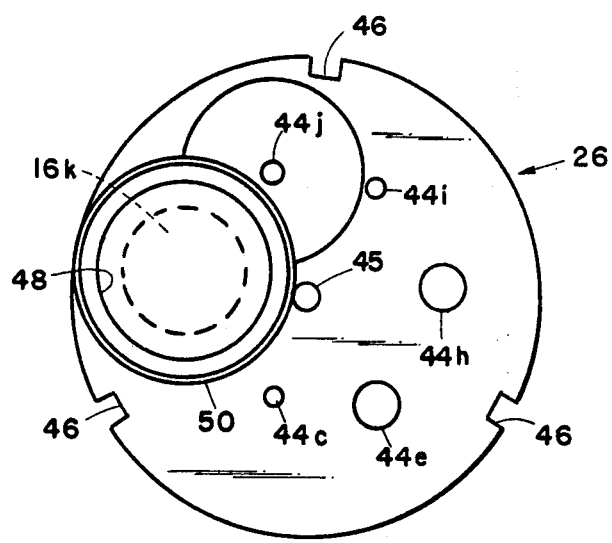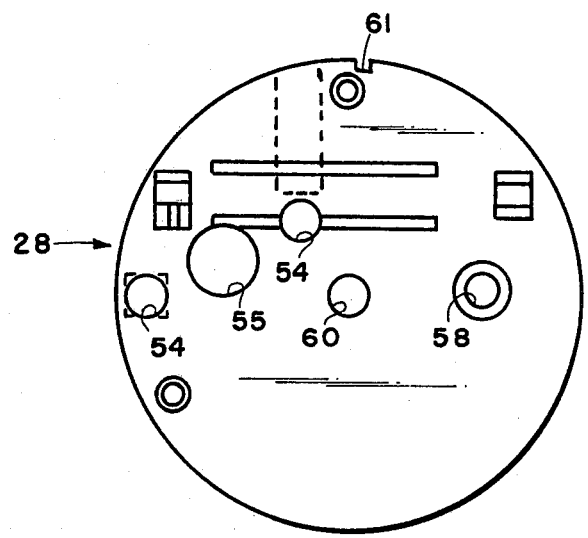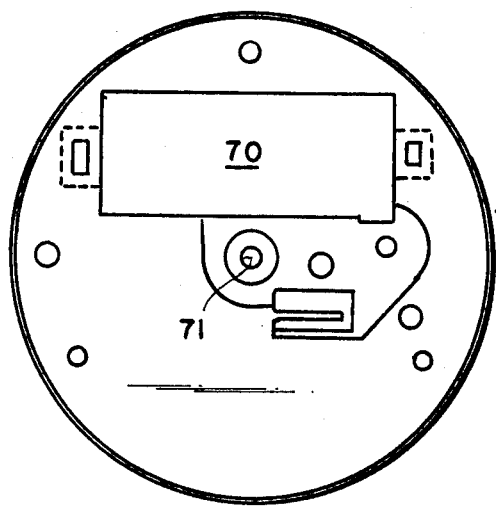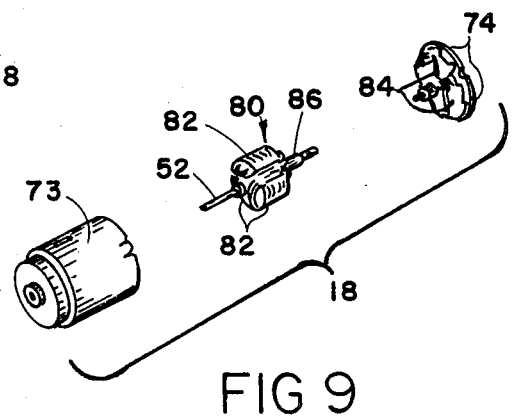

METER READOUT WITH DC MOTOR IMPULSE GENERATOR

BACKGROUND OF THE INVENTION

1. Field of the Invention

This invention relates to fluid flow meters and more particularly to fluid flow meters having impulse generators for actuating readouts located remotely from the fluid flow meter.

2. Description of the Prior Art

In conventional water flow meters, the register forms a part of the measuring mechanism rendering the register inconvenient to read because the mechanism is generally located in the basement of a home or other building. Prior art meters have been developed which include a remote register electrically interconnected to the meter and mounted in a more convenient location, for example on the exterior of the building in which the meter is contained. Typically, these meters include impulse generators which produce an electric signal whenever a fixed volume of fluid passes through the meter. Typically, the generators are driven by biased spur gears, which are released in response to a fixed volume of flow to drive the generator. The remote registers are actuated by the generator signals to provide a readable display.

Prior impulse generators used in fluid flow meters are inadequate for several reasons. One drawback is the relatively high cost of construction of separate magnet field and coil components and the subsequent assembly of such components. For example, the impulse generator shown in U.S. Pat. No. 3,772,917, issued Nov. 20, 1973 to Lutz and Booth, includes a number of intricate components such as ring magnets, a shield, a steel core, wiring, and other accessories such as pigtails. Consequently, the manufacture and assembly of these intricate and complex components is relatively expansive.

Further, many prior art impulse generators typically require a relatively high torque drive in order to generate an adequate, electric signal and they are less efficient, all because they only include a single, electric coil. This high torque requirement mandates that the generator drive gear be driven by a relatively large biasing force, which causes excessive stress and wear on the driving mechanism. Examples of single coil construction are shown in U.S. Pat. No. 3,772,917 and U.S. Pat. No. 3,685,353, issued Aug. 22, 1972 to Gesler, Kovats, and Kolakowski.

One prior fluid flow meter with a remote readout generates its remote-register, actuation signal by providing a plurality of stationary poles and a rotating magnet which combinaton generates an AC signal which is rectified to produce a DC pulse. Such a construction is shown in U.S. Pat. No. 3,599,022, issued Aug. 10, 1971 to Adair. This construction requires driving a relatively heavy magnet and is relatively complicated.

Generally, prior fluid flow meters with impulse generators are difficult to construct. The impulse generator is typically an "add-on" feature extending laterally of the normal meter housing as shown in U.S. Pat. No. 3,772,917. Alternatively, the impulse generators have been located above the meter register located on the metering device making reading of this register difficult as in U.S. Pat. Nos. 3,685,353 and 3,599,022. Prior constructions do not provide for modularity but instead require all components included in the meter to be carefully held in position until completion of the entire assembly.

SUMMARY OF THE INVENTION

The above-mentioned problems are solved by the present invention. Essentially, a fluid flow meter is provided having a novel impulse generator assembly for actuating a readout located remotely from the meter. This impulse generator assembly includes a DC electric motor having a shaft driven by the meter to generate an output signal at the normal input leads of the motor. The motor includes an armature having at least three poles or coils, a first commutator part rotatable with the shaft and connected to the coils of the armature, and a second stationary commutator part having normal input leads connected thereto. At the other end of the armature is the output shaft of the motor to which, as will be explained, a sudden torque is applied for generating the impulse signal. Such a DC motor is well-known in the electric motor art and may be obtained for a fraction of the cost required to construct prior impulse generators.

That a simple, multiple-coil DC motor could be driven in reverse to produce a usable, remote readout signal was totally unexpected. Further, using such a motor produces several unexpected distinct advantages over prior constructions. First, the motor is far less expensive than the specially constructed generators comprising a combination of components forming the magnetic field and coil assemblies. Second, the motor can be assembled directly into the meter so that an assembly of a number of intricate components to form a special impulse generator is not necessary. Further, this motor having an armature having at least three poles or coils is much more efficient and requires far less torque than prior single-coil generators to produce an impulse signal of longer duration adequate to actuate the remote reader. Its improved efficiency permits a small unit and the use of a relatively low-force biasing means to drive the motor.

In a preferred embodiment of the invention, the various components of the fluid flow meter are modularized to facilitate assembly. The meter includes a cup-shaped housing into which the remaining components can be dropped during assembly. The housing is mountable on a fluid flow measuring means. First a mechanism movable in response to the volume of flow is positioned in the bottom of the housing. This is covered by a bottom plate positioned above the mechanism. An impulse generator is then positioned above the bottom plate and covered using a center plate. The impulse generator is operatively connected to the mechanism and actuates a remote register. A meter register is positioned above the center plate and operatively connected to the mechanism for displaying the volume of flow. Finally, a cover through which the meter register may be read is mounted on the open end of said housing. The meter can be easily constructed by dropping the mechanism, bottom plate, impulse generator, center plate, and meter register, sequentially into the cup-shaped housing and then closing the assembly using the cover.

This modular construction facilitates construction rendering the meter both more reliable, smaller, and less expensive than prior meters. Further, the impulse generator is located below the meter register so that the meter register may be easily read. Finally, the housing itself is aesthetically pleasing and, accordingly, more marketable because of its sleek, cylindrical shape.

BRIEF DESCRIPTION OF THE DRAWINGS

FIG. 6 is a plan view of the bottom plate;

FIG. 7 is a plan view of the center plate;

FIG. 8 is a plan view of the top plate; and

FIG. 9 is a perspective, exploded view of the motor.

DESCRIPTION OF THE PREFERRED EMBODIMENT

Figure 3:
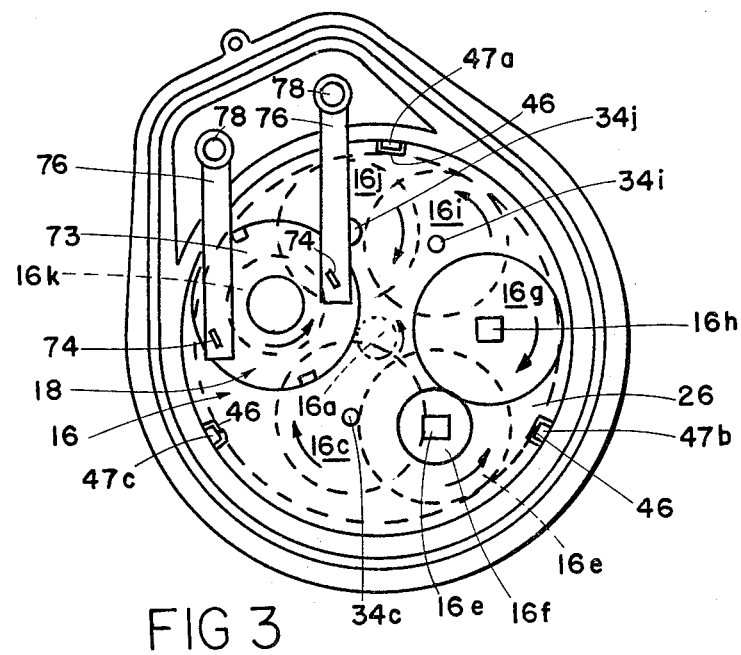
FIG. 3 is a cross-sectional plan view of the housing taken along the plane III—III in FIG. 1 with the center plate removed.

A fluid flow generator-register in accordance with a preferred embodiment of the invention is illustrated in the drawings and generally designated 10. Generator-register 10 (FIG. 1) generally comprises housing 12 and cover 14 enclosing a volume flow response or gear train mechanism 16, a DC motor 18, and a visual display mechanism 20. Display 20 is mechanically, operatively connected to mechanism 16 by the coupler 24 to visually display the volume of flow through the measuring device. Mechanism 16 also drives the motor 18, causing same to produce an electric signal corresponding to a defined volume of fluid flow. The signal produced by motor 18 is conducted to terminals 78, which are adapted to be electrically connected to a remote display located, for example, on the exterior of the building.

The interior of generator-register 10 is separated into three compartments by bottom plate 26 and center plate 28. Bottom plate 26 separates the mechanism 16 from motor 18 and coupler 24, while center plate 28 separates generator 18 and coupler 24 from display 20.

Figure 5:
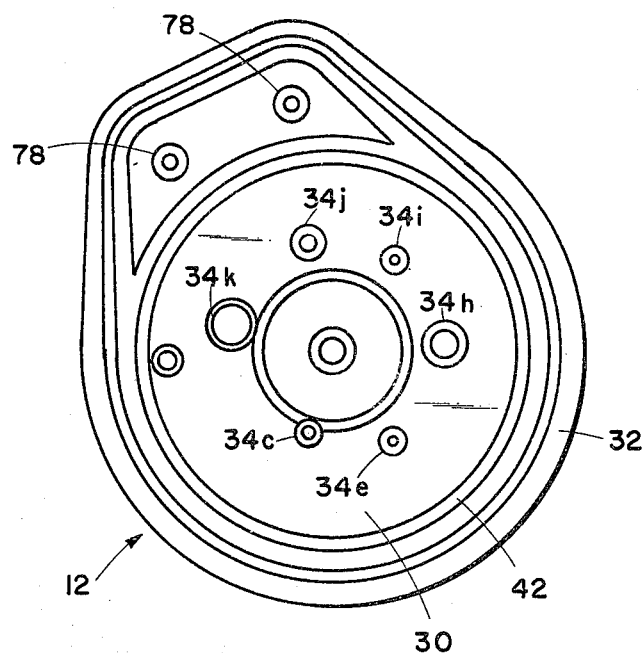
FIG. 5 is a top plan view of the housing.
Figure 4:
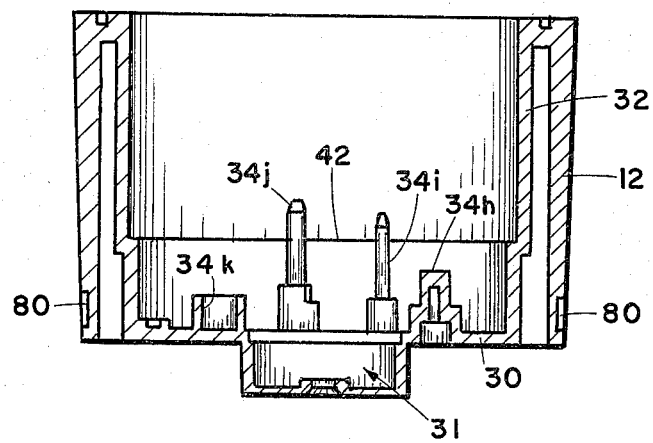
FIG. 4 is an elevational view in cross section of the housing.

Housing 12 (FIGS. 4 and 5) is a cup-shaped member having generally circular bottom 30 with a recess or well 31 and cylindrical wall 32 extending upwardly therefrom. Inside housing 12 extending upwardly from bottom 30 are a plurality of studs or spindles 34c, e, h, i, j, and k, upon which the various gears of mechanism 16 are mounted. Preferably, studs 34 are integrally formed or molded with housing 12.

Figure 2:
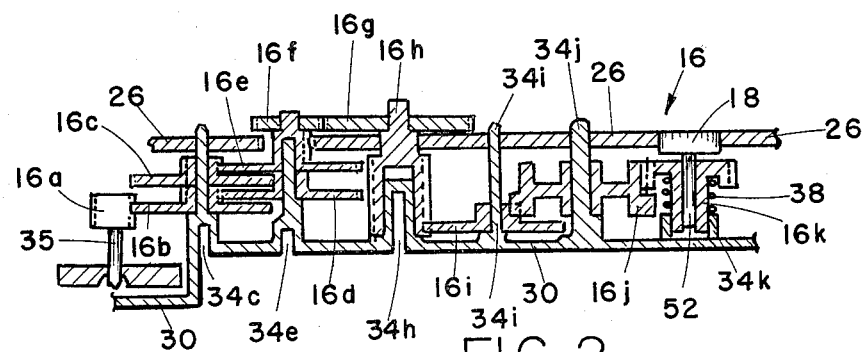
FIG. 2 is an expanded lay out in elevation illustrating the gear train mechanism located within the bottom of the housing.

Mechanism 16 (FIGS. 2 and 3) comprises a gear train which is adapted to translate the rotational movement of the magnet 33 to the visual display through the coupler 24 and also to the impulse generator comprising the DC motor 18. This gear train is best demonstrated by FIG. 2 which moving from left to right discloses the various gears and how they are operatively connected together. In the following description rotational directions are indicated with respect to FIG. 3, i.e. looking down into housing 12.

Figure 1:
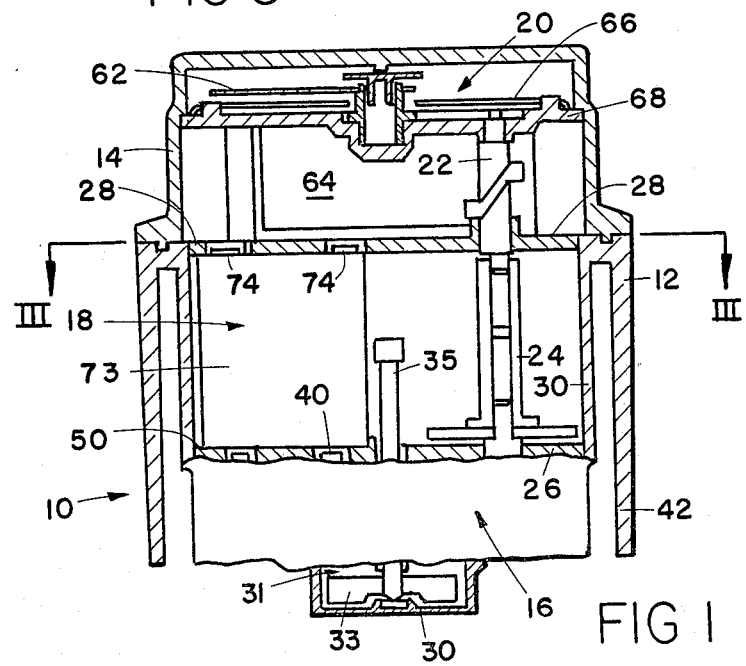
FIG. 1 is an elevational view in cross section of the fluid flow meter of the present invention.

Starting with the main drive shaft 35 it will be seen by FIG. 1 that it is rotatably supported in well 31 and extends the full height of generator-register 10. Magnet 33 is carried on drive shaft 35 so that when generator-register 10 is mounted on a fluid flow measuring device, magnet 33 can be positioned closely adjacent a rotating magnet in the measuring device.

Main drive gear 16a is secured on drive shaft 35 for rotation therewith. In a preferred embodiment, main drive gear 16a rotates counterclockwise. Two identical reducer gears 16b and 16c are rotatably mounted on spindle 34c with gear 16a in driving engagement with gear 16b. Additionally, reducer gear 16d and drive gear 16e are rotatably mounted on spindle 34e with reducer gear 16d in driven engagement with reducer gear 16b and reducer gear 16d drivingly engaging gear 16c. Consequently, main drive gear 16a rotating counterclockwise drives reducer gear 16b clockwise which in turn drives reducer gear 16d counterclockwise which then drives reducer gear 16c clockwise which in turn drives gear 16e counterclockwise.

Change gear 16f is fixedly mounted on the upper end of gear 16e above bottom plate 26 and it engages change gear 16g fixedly mounted on the top spindle of adaptor gear 16h which is rotatably mounted on stud 34h. Adaptor gear 16h drivingly engages reducer gear 16i rotatably mounted on stud 34i.

Rotatably mounted on spindle 34j is generator drive gear 16j which is drivingly engaged by gear 16i. Generator gear 16k is fixedly mounted on shaft 52 extending from motor 18. This gear is positioned at its lower end within cup 34k. Gear 16j is a spur gear having a plurality of teeth missing around its periphery so that generator gear 16k is driven only a predetermined portion of the revolution of gear 16j. The gear ratios of gears 16a–j are selected so that gear 16j makes exactly one revolution in response to a defined volume or rate of flow through meter 10, for example 100 gallons. Further, gears 16a–16j can be easily assembled within housing 12 on the spindles as above described by merely dropping the gears onto the spindles.

Coil spring 38 is positioned around the lower portion of generator drive gear 16k and secured at either end to gear 16k and to housing 12 to bias drive gear 16k in a direction opposite the direction in which gear 16k is driven by gear 16j. This reciprocating spur gear construction is well known to those skilled in the art as taught in U.S. Pat. No. 3,772,917. Suffice it to say that generator drive gear 16k is usually rotated in a drive direction by rotating gear 16j as water flows through the meter. However, because several teeth are missing from gear 16j, gear 16k will occasionally be released by gear 16j at which time coil spring 38 rapidly rotates gear 16k in a direction opposite to the driven direction to cause motor 18 to generate an electric signal as will be described.

Bottom plate 26 (FIG. 6) is a generally circular, planar member which rests on ridge 42 integrally formed into wall 32. Plate 26 includes a plurality of apertures 44c, e, h, i, and j extending therethrough to receive and support stud 34c, gears 16e and h, and studs 34i and j, respectively. Apertures 44 aid in supporting mechanism 16 upon studs 34. Several indexing knockouts 46 are located around the periphery of plate 26 to assist in angularly orienting plate 26 upon mating studs 47a, b, and c within housing 12. Motor aperture 48 also extends through bottom plate 26 and is surrounded by concentric motor support ridge 50 extending upwardly therefrom. DC motor 18 which is a generally cylindrically shaped body, having an exterior diameter substantially the same as the internal diameter of ridge 50, is positioned within ridge 50. Shaft 52 extends through aperture 48 and is fixedly secured within drive gear 16k for rotation therewith. Accordingly, when gear 16k is driven, released, and rapidly rotated, shaft 52 is driven therewith, released therewith, and rapidly rotated therewith. Coupler 24 is mounted between bottom and center plates 26 and 28 on change gear adapter gear 16h for rotation therewith.

Positioned immediately above DC motor 18 and coupler 24 is circular, planar center plate 28 (FIG. 7). Terminal apertures 54 extend through center plate 28 to receive motor terminals 74 which extend upwardly from motor 18. The positioning of terminals 74 within aperture 54 aids in supporting motor 18 within meter 10. Additionally, aperture 55 receives a portion of motor 18 to also assist in supporting the motor within the meter. Cam hole 58 extends through center plate 28 to receive odometer cam 22. Knock out 61 on the periphery of plate 28 orients plate 28 within housing 12 on stud 47a.

Display 20 is located above center plate 28 and principally comprises sweep hand 62 and odometer 64. Odometer cam 22 extends through cam hole 58 in center plate 28 and is mounted on coupler 24 for rotation therewith. Display 20 is well known to one skilled in the art and consequently need not be explained in detail. Suffice it to say that mechanism 16, through coupler 24 and cam 22, rotates sweep hand 62 at a rate responsive to the volume of flow through the meter. Dial face 66 is positioned below sweep hand 62 to indicate the number of units, for example gallons, flowing through the meter. With each revolution of sweep hand 62, odometer cam 22 advances odometer 64 to provide a visual record of the flow volume over a period of time.

Top plate 68 (FIG. 8) is positioned within cover 14 above odometer 64 to support dial face 66. Odometer aperture 70 is generally rectangular and extends through top plate 68 so that odometer 64 may be viewed therethrough.

Motor 18 is a 24-volt direct current motor having armature 80 including at least three coils or poles 82. Preferably, armature 80 is laminated to prevent eddy currents within armature 80. Although any one of a number of DC motors may be used, one motor which works particularly well is that sold by Mabuchi Miniature Motors under Model No. RS-365S10200. As is well known to one skilled in the DC motor art, motor 18 comprises a generally cylindrical body 73 in which two permanent magnets of opposite polarity are mounted. Normal output drive shaft 52 is rotatably mounted along the axis of cylindrical body 73 and has armature 80 mounted thereon. To obtain the desired low torque characteristics of the present invention, it is necessary for armature 80 to have at least three coils or poles 82. It has been found that an armature having five poles provides the optimal characteristics desired for the present invention.

Two terminals 74 extend from motor body 73 and are used to supply a voltage to a remote receiver. A commutator is used to sequentially, electrically connect coils 82 on armature 80 with terminals 74. Such a commutator comprises a stationary portion 84 connected to terminals 74 and a rotatable portion 86 mounted on shaft 52, and electrically connected to coils 82 on armature 80. Consequently, as shaft 52 rotates within motor 18, sequential ones of coils 82 will become electrically connected with terminals 74 through the commutator.

Although a motor of the type used herein is normally used by applying an input voltage across terminals 74 to cause shaft 52 to rotate, motor 18 is used in the present invention by rotating shaft 52 using mechanism 16 to create an output voltage at terminals 74. Because DC motor 18 has at least three coils on its armature, a relatively low torque is required to drive the motor producing a DC signal at terminals 74 adequate to actuate a remote register (not shown). Therefore, coil spring 38 can be fabricated with a lower spring constant than springs used in prior meters. Further, the unit can be smaller because of the increased efficiency.

Terminals 74 are connected by conductor strips 76 to housing terminals 78, which provide a ready connection to which a remote register (not shown) may be electrically connected.

ASSEMBLY AND OPERATION

Generator-register 10 can be easily and rapidly assembled. First, mechanism 16 is placed on bottom 30 of housing 12 with the various gears of mechanism 16 placed on various studs 34 extending upwardly from bottom 30 as described above. Bottom plate 26 is then positioned in housing 12 resting on ridge 42 with several of gears 16 and studs 34 extending upwardly through apertures 44. Motor 18 having drive gear 16k secured to drive shaft 52 is then placed within ridge 50 on bottom plate 26 with gear 16k extending through motor aperture 48. Conductor strips 76 are electrically connected between motor terminals 74 and housing terminals 78, and coupler 24 is mounted on gear 16h which extends through bottom plate 26. Center plate 28 is then positioned above motor 18 so that apertures 54 are aligned with motor terminals 74. Odometer cam 22 is inserted through cam hole 58 and mounted in coupler 24, and odometer 64 is placed on center plate 28. Top plate 68 is placed in position over odometer 64, and dial 66 and sweep hand 62 are installed on top plate 68. The entire assembly is then closed by placing cover 14 over display 20 and sealing the cover to housing 12.

Generator-register 10 is mounted on a fluid flow measuring device using locking tamper-proof pins 80 (FIG. 4) so that gear train 16 operates to measure the volume of flow through the measuring device. As gear train 16 moves in response to this volume, drive gear 16k is normally driven in a drive direction thereby increasing the tension or bias in coil spring 38. Because gear 16j is a spur gear with missing teeth, it will become periodically disengaged from gear 16k so that spring 38 rapidly rotates drive gear 16k in a direction opposite to the drive direction. The rapid rotation of drive gear 16k also rotates shaft 52 rapidly therewith causing DC motor 18 to generate an output signal at terminals 74. Relatively little torque is required to produce the signal because motor 18 includes an armature having at least three coils or poles which also produces a signal of longer duration than prior impulse generators. The output signal at terminals 74 is conducted along strips 76 to housing terminals 78, which in turn are electrically connected to the remote reader (not shown). This remote reader is actuated by the electric output signals to provide an accurate and conveniently located display of the volume flowing through the meter. Additionally, gear train 16 through coupler 24 the odometer cam 22 drives both sweep hand 62 and odometer 64 so that an accurate meter display is also maintained.

It should be understood that the above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. An improved fluid flow generator device having a casing, measuring means mounted to said casing including a rotating gear mounted thereon, each revolution of said rotating gear being responsive to a defined volume of flow through said meter, registry means mounted remotely from said meter for providing a visual readout of said volume of flow through said meter, and impulse generating means for converting the movement of said rotating gear into pulses of electrical energy for actuating said registry means, said generating means including a directional reversing gear driven in a driven direction by said rotating gear during only a portion of each revolution of said rotating gear, and biasing means for biasing said directional reversing gear opposite said drive direction by said biasing means;

the improvement comprising:

a DC electric motor having a shaft operatively connected to said reversing gear, said electric motor including an armature having three poles or coils, said armature being mounted on said shaft and having a first commutator element rotatable therewith and connected to the coils of said armature, a stationary commutator element having normal power input leads connected thereto, and electric circuitry connecting the normal input leads of said electric motor to said registry means, whereby when said biasing means rapidly rotates said reversing gear, said shaft and armature rapidly rotate so that said electric motor generates to said normal leads an output signal transmitted through said electric circuitry to actuate said registry means.

2. The fluid flow generator device of claim 1 wherein said DC motor has a nominal voltage up to 24 volts.

3. An improved and easily assembled fluid flow generator device for use with a fluid flow measuring means comprising:

a cup-shaped housing having a bottom and a wall extending upwardly therefrom to an open end;

means for mounting said housing adjacent said fluid flow measuring means;

a mechanism supported on said bottom of said housing movable in response to the volume of fluid flow;

a generally planar bottom plate positioned above said mechanism, and spaced above said bottom;

an electric DC motor positioned above said bottom plate and having its drive shaft extending through said plate so as to be operatively connected through said bottom plate to said mechanism, said DC motor having three coils or poles and commutator means for producing in response to a rapid rotation of its drive shaft a pulsed signal for actuating a first remotely located register means, for recording said volume of flow;

a generally planar center plate positioned above said DC motor, said center plate being generally parallel to said bottom plate;

a second visible register means positioned above said center plate operatively connected through said center plate and said bottom plate to said mechanism for detecting and visually displaying said volume of flow; and a housing cover mounted to said open end of said housing, said cover including means for permitting the viewing of said second register means.

4. An improved fluid flow generator device having a casing, measuring means mounted to said casing including a rotating gear mounted thereon, each revolution of said rotating gear being responsive to a defined volume of flow through said meter, registry means mounted remotely from said meter for providing a visual readout of said volume of flow through said meter, and impulse generating means for converting the movement of said rotating gear into pulses of electrical energy for actuating said registry means, said generating means including a directional reversing gear driven in a drive direction by said rotating gear during only a portion of each revolution of said rotating gear, and biasing means for biasing said directional reversing gear opposite said drive direction by said biasing means;

the improvement comprising:

a DC electric motor having a shaft operatively connected to said reversing gear, said electric motor including an armature having five poles or coils, said armature being mounted on said shaft and having a first commutator element rotatable therewith and connected to the coils of said armature, a stationary commutator element having normal power input leads connected thereto, and electric circuitry connecting the normal input leads of said electric motor to said registry means, whereby when said biasing means rapidly rotates said reversing gear, said shaft and armature rapidly rotate so that said electric motor generates to said normal leads an output signal transmitted through said electric circuitry to actuate said registry means.

5. An improved fluid flow generator device having a casing, measuring means mounted to said casing including a rotating gear mounted thereon, each revolution of said rotating gear being responsive to a defined volume of flow through said meter, registry means mounted remotely from said meter for providing a visual readout of said volume of flow through said meter, and impulse generating means for converting the movement of said rotating gear into pulses of electrical energy for actuating said registry means, said generating means including a directional reversing gear driven in a drive direction by said rotating gear during only a portion of each revolution of said rotating gear, and biasing means for biasing said directional reversing gear opposite said drive direction by said biasing means;

the improvement comprising:

a DC electric motor having a nominal voltage up to 24 volts, said electric motor having a shaft operatively connected to said reversing gear, said electric motor including an armature having five poles or coils, said armature being mounted on said shaft and having a first commutator element rotatable therewith and connected to the coils of said armature, a stationary commutator element having normal power input leads connected thereto, and electric circuitry connecting the normal input leads of said electric motor to said registry means, whereby when said biasing means rapidly rotates said reversing gear, said shaft and armature rapidly rotate so that said electric motor generates to said normal leads an output signal transmitted through said electric circuitry to actuate said registry means.

6. An improved and easily assembled fluid flow generator device for use with a fluid flow measuring means comprising:
   a cup-shaped housing having a bottom and a wall extending upwardly therefrom to an open end, said housing including a plurality of studs formed integrally with and extending upwardly from said bottom;
   means for mounting said housing adjacent said fluid flow measuring means;
   a mechanism supported on said bottom of said housing movable in response to the volume of fluid flow, said mechanism comprising a plurality of gears rotatably mounted on said studs, whereby during assembly of said meter said gears can be dropped onto said studs;
   a generally planar bottom plate positioned above said mechanism, and spaced above said bottom;
   an impulse generator means positioned above said bottom plate operatively connected through said bottom plate to said mechanism to supply a signal for actuating a first remotely located register means, for recording said volume of flow;
   a generally planar center plate positioned above said generator, said center plate being generally parallel to said bottom plate;
   a second visible register means positioned above said center plate operatively connected through said center plate and said bottom plate to said mechanism for detecting and visually displaying said volume of flow; and
   a housing cover mounted to said open end of said housing, said cover including means for viewing said second register means.

7. The fluid flow generator device of claim 6 wherein said studs are integrally formed with said bottom.

8. The fluid flow generator device of claim 6 or 7 wherein said bottom plate includes means for supporting ones of said gears and said studs.

9. The fluid flow generator device of claim 9 wherein said supporting means comprises a plurality of apertures one for each of said supported gears and studs.

10. An improved and easily assembled fluid flow generator device for use with a fluid flow measuring means comprising:
   a cup-shaped housing having a bottom and a wall extending upwardly therefrom to an open end;
   means for mounting said housing adjacent said fluid flow measuring means;
   a mechanism supported on said bottom of said housing movable in response to the volume of fluid flow;
   a generally planar bottom plate positioned above said mechanism, and spaced above said bottom;
   an electric DC motor positioned above said bottom plate and having its drive shaft extending through said plate so as to be operatively connected through said bottom plate to said mechanism, said DC motor having five coils or poles and commutator means for producing in response to a rapid rotation of its drive shaft a pulsed signal for actuating a first remotely located register means, for recording said volume of flow;
   a generally planar center plate positioned above said geneator, said center plate being generally parallel to said bottom plate;
   a second visible register means positioned above said center plate operatively connected through said center plate and said bottom plate to said mechanism for detecting and visually displaying said volume of flow; and
   a housing cover mounted to said open end of said housing, said cover including means for permitting the viewing of said second register means.

11. The fluid flow generator device of claims 3 or 10 wherein said bottom and center plates include means for supporting a portion of said mechanism and said motor.

12. The fluid flow generator device of claim 11 wherein said housing is cylindrical and further comprising means for orienting said bottom and center plates in said housing.

13. The fluid flow generator device of claims 3 or 10 wherein said second register means comprises:
   an odometer;
   a top plate positioned above said odometer, said top plate including an aperture through which said odometer can be viewed;
   a dial face positioned above and supported on said top plate, said dial face having an aperture aligned with said top plate aperture; and
   a sweep hand positioned above said dial face.

14. The fluid flow generator device of claim 13 wherein said bottom plate includes means for supporting a portion of said mechanism.

15. The fluid flow generator device of claim 14 wherein said bottom and center plates include means for supporting a portion of said motor.

16. The fluid flow generator device of claim 13 wherein said housing is cylindrical and further comprising means for orienting said bottom and center plates in said housing.

17. The fluid flow generator device of claim 3 or 10 wherein said housing includes a plurality of studs extending upwardly from said bottom and said mechanism comprises a plurality of gears rotatably mounted on said studs, whereby during assembly of said meter said gears can be dropped onto said studs.

* * * * *